United States Patent
Nasato et al.

(10) Patent No.: US 10,246,328 B2
(45) Date of Patent: Apr. 2, 2019

(54) HIGH EFFICIENCY PROCESS FOR DEGASSING OF HYDROGEN SULFIDE FROM LIQUID SULFUR

(71) Applicant: WorleyParsons Europe Ltd., Brentford (GB)

(72) Inventors: Elmo Nasato, Oakville (CA); Frank Bela, Monrovia, CA (US); Bill DeWees, Monrovia, CA (US); Lance Christie, Brentford (GB); Stephen Pollitt, Brentford (GB); Robin Street, Brentford (GB); David Evans, Brentford (GB)

(73) Assignee: WorleyParsons Europe Ltd., Brentford (GB)

( * ) Notice: Subject to any disclaimer, the term of this patent is extended or adjusted under 35 U.S.C. 154(b) by 0 days.

(21) Appl. No.: 15/546,932

(22) PCT Filed: Dec. 17, 2015

(86) PCT No.: PCT/EP2015/080360
§ 371 (c)(1),
(2) Date: Jul. 27, 2017

(87) PCT Pub. No.: WO2016/142018
PCT Pub. Date: Sep. 15, 2016

(65) Prior Publication Data
US 2018/0016143 A1     Jan. 18, 2018

Related U.S. Application Data

(60) Provisional application No. 62/131,356, filed on Mar. 11, 2015.

(51) Int. Cl.
*C01B 17/02*     (2006.01)
*B01D 19/00*     (2006.01)

(52) U.S. Cl.
CPC ...... *C01B 17/0232* (2013.01); *B01D 19/0005* (2013.01); *B01D 19/0036* (2013.01)

(58) Field of Classification Search
CPC . C01B 17/0232; C01B 17/02; B01D 19/0005; B01D 19/00; B01J 19/00
See application file for complete search history.

(56) References Cited

U.S. PATENT DOCUMENTS 3,397,041 A *   8/1968   Rivers ................. C01B 17/0232
                                                                203/87
4,131,437 A     12/1978   Campbell et al.
(Continued)

FOREIGN PATENT DOCUMENTS

CA     2 467 947 A1     11/2005
CN     2 813 585 Y     9/2006
(Continued)

OTHER PUBLICATIONS

Office Action issued in corresponding Japanese Application No. 2017-547427 dated Sep. 5, 2018, and English translation thereof (14 pages).
(Continued)

*Primary Examiner* — Timothy C Vanoy
(74) *Attorney, Agent, or Firm* — Osha Liang LLP

(57) ABSTRACT

Processes and systems for degassing liquid sulfur may include mixing a gas, such as air, with a liquid sulfur mixture comprising sulfur, hydrogen sulfide, and hydrogen polysulfides to form a sulfur-gas mixture. The sulfur-gas mixture may then be transported to a separator, storage vessel or storage tank for separating the sulfur-gas mixture.

20 Claims, 6 Drawing Sheets

(56) References Cited

U.S. PATENT DOCUMENTS

| | | | |
|---|---|---|---|
| 4,729,887 A | 3/1988 | Pendergraft | |
| 4,844,720 A | 7/1989 | Pendergraft et al. | |
| 5,080,695 A | 1/1992 | Kassarjian | |
| 5,632,967 A * | 5/1997 | Nasato | C01B 17/0232 423/567.1 |
| 5,935,548 A | 8/1999 | Franklin et al. | |
| 6,149,887 A | 11/2000 | Lagas et al. | |
| 7,081,223 B2 | 7/2006 | Khoury | |
| 8,084,013 B2 * | 12/2011 | Tonjes | C01B 17/0232 422/255 |
| 8,361,432 B2 | 1/2013 | Parekh et al. | |
| 8,663,596 B2 | 3/2014 | Garg et al. | |
| 2010/0178236 A1 | 7/2010 | Rameshni et al. | |
| 2013/0071315 A1 * | 3/2013 | Chow | B01D 19/0005 423/567.1 |

FOREIGN PATENT DOCUMENTS

| | | | | |
|---|---|---|---|---|
| CN | 2813585 Y * | 9/2006 | | C01B 17/0232 |
| JP | S49-049894 A | 5/1974 | | |
| KR | 10-1999-0044667 A1 | 6/1999 | | |

OTHER PUBLICATIONS

International Search Report issued in PCT/EP2015/080360 dated Apr. 14, 2016 (2 pages).
Written Opinion of the International Searching Authority issued in PCT/EP2015/080360 dated Apr. 14, 2016 (5 pages).
Office Action issued in corresponding Korean Application No. 10-2017-7022826 dated Jul. 23, 2018, and English translation thereof (14 pages).

* cited by examiner

HIGH EFFICIENCY PROCESS FOR DEGASSING OF HYDROGEN SULFIDE FROM LIQUID SULFUR

FIELD OF THE DISCLOSURE

Embodiments disclosed herein relate generally to removal of hydrogen sulfide and hydrogen polysulfides from elemental sulfur.

BACKGROUND

Generally, the Claus process is used to recover sulfur from hazardous waste gas streams containing hydrogen sulfide gas, such as various streams produced during refining of petroleum products, natural gas processing, and gasification. The Claus process entails partially combusting hydrogen sulfide to produce sulfur dioxide. Sulfur dioxide then reacts with the remaining hydrogen sulfide to produce sulfur. Sulfur is then recovered from the Claus process in a liquid form.

The liquid sulfur produced from the Claus process contains hydrogen polysulfides and dissolved hydrogen sulfide gas. The hydrogen polysulfides degrade slowly, producing toxic, odorous and highly flammable hydrogen sulfide gas. A large portion of the hydrogen sulfide gas is retained by the liquid sulfur as a dissolved gas. In untreated liquid sulfur, the hydrogen sulfide gas slowly diffuses into the vapor phase. The gradual degradation of the hydrogen polysulfides and the release of the dissolved hydrogen sulfide gas during storage and transportation involve substantial health, safety and environmental risks and may result in fire. For example, tests have shown that $H_2S$ concentrations of greater than 20 ppm by weight in liquid sulfur can result in closed vapor spaces having $H_2S$ concentrations greater than the lower explosion limit of 3.5%. Obviously, the explosivity concern is also coupled with the $H_2S$ toxicity concerns ($H_2S$ is toxic at 0.05%). Toxic levels of $H_2S$ can build up in closed vapor spaces of sulfur pits and transport containers. Also, high levels of $H_2S$ may accumulate near sulfur pits and sulfur loading areas.

Various processes have been developed to mitigate issues with the gradual release of hydrogen sulfide gas from liquid sulfur. For example, various sulfur degasification processes have been proposed to remove dissolved hydrogen sulfide ($H_2S$) and hydrogen polysulfides ($H_2S_x$) from the produced liquid sulfur, such as those disclosed in one or more of U.S. Pat. Nos. 4,131,437, 4,729,887, 4,844,720, 5,080,695, 5,632,967, 5,935,548, 6,149,887, 7,081,223, and 8,084,013, among others. Among these, processes are disclosed for bubbling air through liquid sulfur, as well as for co-current or counter-current contacting of air and liquid sulfur.

Common issues of these degasification processes are long residency times to achieve the desired hydrogen sulfide ($H_2S$) level in the liquid sulfur, large plot space requirements for sulfur pit and associated degassing equipment, and corrosion of degassing vessels and/or internals located in or external of the sulfur pit and the associated maintenance of this equipment and/or these internals.

SUMMARY OF THE DISCLOSURE

Embodiments disclosed herein address kinetic and transport limitations related to the decomposition of the hydrogen polysulfides and hydrogen sulfide removal from liquid sulfur.

In one aspect, embodiments disclosed herein relate to a process for degassing liquid sulfur. The process may include mixing gas or gas mixtures, described below, with a liquid sulfur mixture containing sulfur, hydrogen sulfide, and hydrogen polysulfides to form a sulfur-air mixture. The sulfur-gas mixture may then be transported to a separator, storage vessel or storage tank for separating the sulfur-gas mixture at a pressure below a water condensation point to recover a degassed sulfur product and a vapor stream comprising the gas or gas mixture and hydrogen sulfide. Gases that may be used in embodiments herein may include one or more of air, air, nitrogen, oxygen, oxygen enriched air, $SO_2$, $CO_2$, Claus reactor tail gas, SRU tail gas and tail gas treatment unit recycle gas or tail gas, or mixtures thereof.

In another aspect, embodiments disclosed herein relate to a process for degassing liquid sulfur. The process may include transporting, from a sulfur pit or vessel to a separator, storage vessel or storage tank, a liquid sulfur mixture including sulfur, hydrogen sulfide, and hydrogen polysulfides via an undegassed or partially degassed sulfur transfer pump. Air, or other appropriate gas or gas mixture, is introduced into a suction of the sulfur transfer pump, the sulfur transfer pump mixing the air/gas and the liquid sulfur mixture to form a sulfur-gas mixture. The sulfur-gas mixture is then separated in the separator, storage vessel or storage tank to recover a degassed sulfur product and a vapor stream comprising the gas and hydrogen sulfide.

In another aspect, embodiments disclosed herein relate to a system for degassing liquid sulfur. The system may include a sulfur pit or vessel containing a liquid sulfur mixture including sulfur, hydrogen sulfide, and hydrogen polysulfides. The system may also include a separator, storage vessel or storage tank and an undegassed sulfur transfer pump for transferring the liquid sulfur mixture from the sulfur pit to the separator, storage vessel or storage tank. A feed line is provided for introducing pressurized air or gas to the liquid sulfur during transfer from the sulfur pit to the separator, storage vessel or storage tank, which may include a separator, storage vessel or storage tank vapor outlet for recovering a vapor product comprising the air/gas and hydrogen sulfide and a separator, storage vessel or storage tank liquid outlet for recovering a degassed liquid sulfur product. The air, gas, or gas mixture may be introduced into the pump discharge, the transfer piping, piping fittings and valves, instrument connections or the sulfur cooler with or without mixing or distribution devices. The air, gas or gas mixture may be introduced into the recirculation flow from the pump back to the pit or vessel (the recirculation flow may be external or internal to the pump).

Other aspects and advantages will be apparent from the following description and the appended claims.

DETAILED DESCRIPTION

Figure 1:
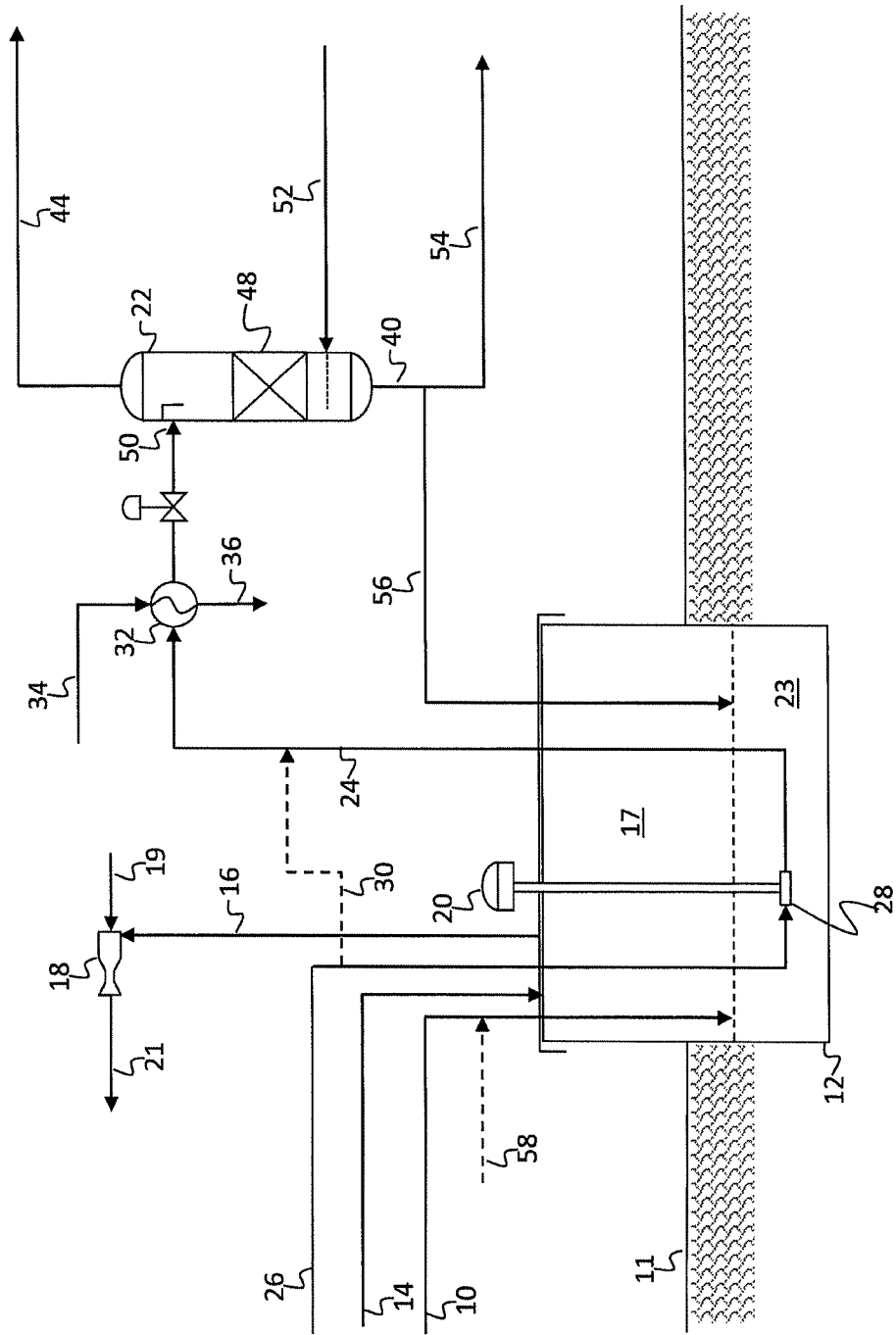
FIG. 1 is a simplified process flow diagram of a sulfur degassing system according to embodiments herein.

Embodiments disclosed herein relate generally to removal of hydrogen sulfide and hydrogen polysulfides from elemental sulfur. More specifically, embodiments disclosed herein relate to removal of hydrogen sulfide and hydrogen polysulfides from liquid or molten sulfur, such as may be produced in a Claus unit or a Claus-like process.

A sulfur recovery unit generally includes one or more sulfur removal systems, as well as an incinerator and/or stack systems. An acid gas feed, such as from an amine gas unit, a sour water stripper unit, and/or other sources of acid gas, and which may include hydrogen sulfide, carbon dioxide, light hydrocarbons, and mercaptans, among other components, is combusted in the presence of oxidizing gases to react and form sulfur. Alternatively or additionally, one or more catalytic reactors may be provided to react the sulfur feed to produce sulfur.

The molten or liquid sulfur stream produced in the sulfur recovery unit may then be fed to a holding tank, such as a sulfur pit. At this point, the raw liquid sulfur product may contain a significant amount of hydrogen sulfide. For example, a liquid sulfur stream produced from a Claus Unit may contain 250 to 350 ppm by weight hydrogen sulfide, in the combined form of hydrogen sulfide and chemically bound hydrogen polysulfides.

Embodiments disclosed herein provide for degassing of the liquid sulfur, removing a substantial portion of the hydrogen sulfide from the raw liquid sulfur product, prior to sending the sulfur product to storage, loading, or further processing. The liquid sulfur, containing sulfur, hydrogen sulfide, hydrogen polysulfides, may be admixed with a gas, such as one or more of air, nitrogen, oxygen, oxygen enriched air, $SO_2$, $CO_2$, Claus reactor tail gas, SRU tail gas and tail gas treatment unit recycle gas or tail gas, to form a liquid sulfur-gas mixture. separator, storage vessel or storage tank In contrast to prior systems that bubble air or other gases through liquid sulfur and systems that contact air or other gases and liquid sulfur over a contact structure, it has been found that intimately mixing the gas with the liquid sulfur advantageously improves the overall diffusion of the gas into the liquid sulfur and also the kinetic reaction rates for rapid oxidation of dissolved hydrogen sulfide and rapid decomposition of hydrogen polysulfides. Intimate mixtures of air or other gases and liquid sulfur may be formed, for example, by introducing the gas immediately prior to or during transport of the liquid sulfur from a liquid sulfur source to, for example, a separator, storage vessel, heat exchanger, or sulfur storage tank. By forming the mixture immediately prior to or during transport, the gas is dispersed into the liquid sulfur, overcoming diffusivity barriers normally encountered with gas/liquid contact devices and facilitating the rapid decomposition of hydrogen polysulfides.

The liquid sulfur-gas mixture formed may then be transported to a separator, storage vessel or storage tank, where the sulfur-gas mixture is separated to recover a degassed sulfur product and a vapor phase including the gas, hydrogen sulfide, and any sulfur oxides (e.g., $SO_2$) and water formed during the removal of the hydrogen sulfide and hydrogen polysulfides. Liquid sulfur may be transferred from a liquid sulfur source, such as a sulfur pit or vessel used to accumulate liquid sulfur from a Claus sulfur recovery plant, to a separator, storage vessel or storage tank, heat exchanger, and/or sulfur storage tank for recovery of a degassed sulfur product. The transfer may be facilitated, for example, using an undegassed or partially degassed sulfur transfer pump, such as an immersion pump, submersible pump or external sulfur transfer pump. In some embodiments, the gas may be introduced to the suction of the pump. The impellers of the pump provide for intimate mixing of the two streams (liquid sulfur and gas) and for feeding of the resulting mixture to the separator, storage vessel or storage tank, heat exchanger, and/or storage tank. In other embodiments, the gas may be introduced downstream of the pump, where the transfer line may include a static mixer or other devices for dynamically or intimately mixing liquid and vapor streams. In yet other embodiments, the gas may be introduced to the suction of the pump as well as to the transfer line.

The intimate mixture of gas and liquid sulfur may then be transported to a separator, storage vessel or storage tank, heat exchanger, and/or storage tank. The separator, storage vessel or storage tank may be any type of vapor-liquid separator, storage vessel or storage tank. While a simple flash drum may suffice, a separator, storage vessel or storage tank having internals, such as a structured packing, random packing, trays, or a combination of packing and trays, may facilitate the diffusion of the gas and hydrogen sulfide from the liquid sulfur. In some embodiments, additional gas may be fed to a lower portion of the separator, storage vessel or storage tank, providing for counter-current contact with downward flowing liquid sulfur, which may be introduced to an upper portion of the separator, storage vessel or storage tank.

During transport, the sulfur-gas mixture may be heated or cooled to a temperature in the range from about 250° F. to about 300° F., such as in the range from about 260° F. to about 290° F., or from about 275 to about 285° F.

In some embodiments, the gas introduced is air. The "air" or "gas" used may have a relatively low water concentration, and in some embodiments may have less than 10% relative humidity, such as less than 5% relative humidity. In some embodiments, the gas is free of or essentially free of water (i.e., zero or essentially zero humidity).

Humidity (water) introduced to the system or resulting from the oxidation reaction may introduce an undesirable corrosion mechanism in downstream equipment. As water is produced during the decomposition reaction, the corrosion mechanism cannot be avoided altogether. To minimize the corrosive effects introduced by the water, the separator, storage vessel or storage tank may be operated at a pressure below a water condensation point of the vapor product recovered from the separator, storage vessel or storage tank. In some embodiments, the separator, storage vessel or storage tank and any associated overhead equipment may be operated at a pressure of less than 40 psig, such as in the range from about 20 to about 40 psig, in the range from about 25 to about 35 psig, or in the range from about 30 to about 35 psig. Operating at such pressures will maintain the water in the vapor phase, avoiding condensation at the selected separator, storage vessel or storage tank or other downstream operating temperatures, generally in the range from about 250° F. to about 300° F., as noted above.

In some embodiments, a liquid degassing catalyst may be combined with the undegassed liquid sulfur prior to or after mixing of the liquid sulfur with the gas. For example, a liquid degassing catalyst may be fed to the sulfur pit for admixture with the liquid sulfur prior to admixture with gas in the liquid sulfur transfer pump. Introduction of the catalyst upstream of the gas injection point may further promote the decomposition of hydrogen polysulfides into hydrogen sulfide, resulting in very rapid sulfur degassing. Liquid catalysts that may be used according to embodiments herein may include cyclohexylamine, morpholine, urea or other liquid solvents that have been utilized to enhance liquid sulfur degassing.

Additionally, for separators, storage vessels or storage tanks having contact structures or other internals, solid catalysts may also be used to further facilitate and enhance the degassing. Various useful solid catalysts or catalyst structures are described in U.S. Pat. No. 8,361,432 and U.S. Pat. No. 8,663,596, for example.

The intimate mixing of gas and liquid sulfur, as described above, provides for rapid decomposition of the hydrogen polysulfides. The increased oxidation reaction rate allows the degassing residence time to be in the order of minutes, compared to 4 to 24 hours for most other degassing processes. In some embodiments, a degassing residence time (inclusive of transfer line(s) from the pump to the separator, storage vessel or storage tank and holdup time in the separator, storage vessel or storage tank) may be in the range from about 0.5 to about 30 minutes, such as from about 1 minute to about 10 or 15 minutes, for example.

The liquid sulfur product recovered from the separator, storage vessel or storage tank may have a reduced level of hydrogen sulfide and hydrogen polysulfides as compared to the feed. In some embodiments, the liquid sulfur product may have less than 10 ppm by weight total of hydrogen polysulfides and dissolved hydrogen sulfide, such as less than 5 ppm by weight in other embodiments, and less than 2 ppm by weight in yet other embodiments.

The degassed liquid product recovered from the bottoms of the separator, storage vessel or storage tank may be fed to a downstream storage tank or loading system. In some embodiments, a portion of the liquid sulfur product may be recycled for further processing in the separator, storage vessel or storage tank. The recycle flow may be external or internal to the pump. Due to the operating pressure of the separator, storage vessel or storage tank, which may be up to about 40 psig, it may be possible to transport the degassed liquid product from the separator, storage vessel or storage tank to the downstream unit without the use of additional pumps.

Referring now to FIG. 1, a simplified process flow diagram of a system for degassing liquid sulfur according to embodiments herein is illustrated. A sulfur product 10 from a sulfur recovery unit (not shown) may be fed to a sulfur pit 12, which may be at least partially below grade 11. A sweep gas 14 may also be introduced to the vapor space of the sulfur pit 12. The sweep gas and other vapors may be withdrawn from the vapor space 17 of sulfur pit 12 via flow line 16. In some embodiments, the vapors may be withdrawn via a steam eductor 18, where steam provided via flow line 19 may draw vapors from the sulfur pit into an educator in the outlet line 21. The withdrawn vapors may then be fed via flow line 21 to an incinerator, a reaction furnace, or Claus reactors (not shown).

A sulfur pump 20 may be used to transfer liquid sulfur 23 from sulfur pit 12 to a separator, storage vessel or storage tank 22, such as via flow line 24. Airgas may be introduced via flow line 26 to a suction 28 of sulfur pump 20. The pump provides the intimate mixing of the liquid sulfur intake and the gas, passing the resulting mixture to separation column 22, which may operate at a pressure in the range from 25 psig to about 35 psig and a temperature in the range from about 260° F. to about 290° F., such as from about 280° F. to about 285° F.

If necessary, the liquid sulfur-gas mixture may be heated or cooled to separation temperature via indirect heat exchange in exchanger 32. For example, the liquid sulfur may be cooled via indirect heat exchange with boiler feed water 34, and the heated boiler feed water 36 may be fed to the sulfur recovery unit (not shown).

In separator, storage vessel or storage tank 22, the liquid sulfur may be separated from the air or gas, hydrogen sulfide, and any water and/or sulfur dioxide formed. The degassed liquid sulfur may be recovered from a bottom of separator, storage vessel or storage tank 22 via flow line 40, and the separated vapors may be recovered from a top of separator, storage vessel or storage tank 22 via flow line 44. The separated vapors may be fed, for example, to a sulfur recovery unit burner or to an incinerator (not shown).

Separator, storage vessel or storage tank 22 may be a simple flash drum or may include internals to facilitate the separation of vapors from the liquid sulfur. As illustrated in FIG. 1, separator, storage vessel or storage tank 22 includes a bed 48 of internals, which may be catalytic or non-catalytic, such as a structured packing. The bed 48 may be disposed below the feed point 50 of the liquid sulfur-gas mixture. Separator, storage vessel or storage tank 22 may also include a sufficient vapor-liquid disengagement zone or de-entrainment devices to prevent entrainment of liquid sulfur into the separator, storage vessel or storage tank overhead system and associated piping.

In some embodiments, such as illustrated in FIG. 1, separator, storage vessel or storage tank 22 may also include an inlet 52 proximate a bottom of the separator, storage vessel or storage tank for introduction of gas to a lower portion of the separator, storage vessel or storage tank. Gas fed via inlet 52 may provide counter-current contact with the liquid sulfur, further enhancing the degassing process. A lower portion of separator, storage vessel or storage tank 22, below inlet 52, may provide for sufficient residence time to allow any dissolved gas to exit the accumulated liquid prior to the liquid sulfur being recovered via flow line 40. Following recovery, the liquid sulfur may be fed via flow line 54 to downstream processing (storage, loading, etc.) and/or may be recycled to sulfur pit 12 via flow line 56 for further processing.

Alternatively or additionally, gas may be introduced to flow line 24 downstream of pump 20, such as via flow line 30. Further, in some embodiments, a liquid degassing catalyst may be combined with the undegassed liquid sulfur prior to or after mixing of the liquid sulfur with the gas. For example, as illustrated in FIG. 1, a liquid degassing catalyst 58 may be fed to the sulfur pit 12 for admixture with the liquid sulfur 23 prior to admixture with gas 26 in the liquid sulfur transfer pump 20.

As illustrated in FIG. 1, a gas is introduced to the suction of a submerged liquid sulfur pump, the pump then intimately mixing the gas with the liquid sulfur and transporting the mixture downstream. Such mixing may be used to benefit other degassing processes, such as illustrated in FIGS. 2-6.

Figure 2:
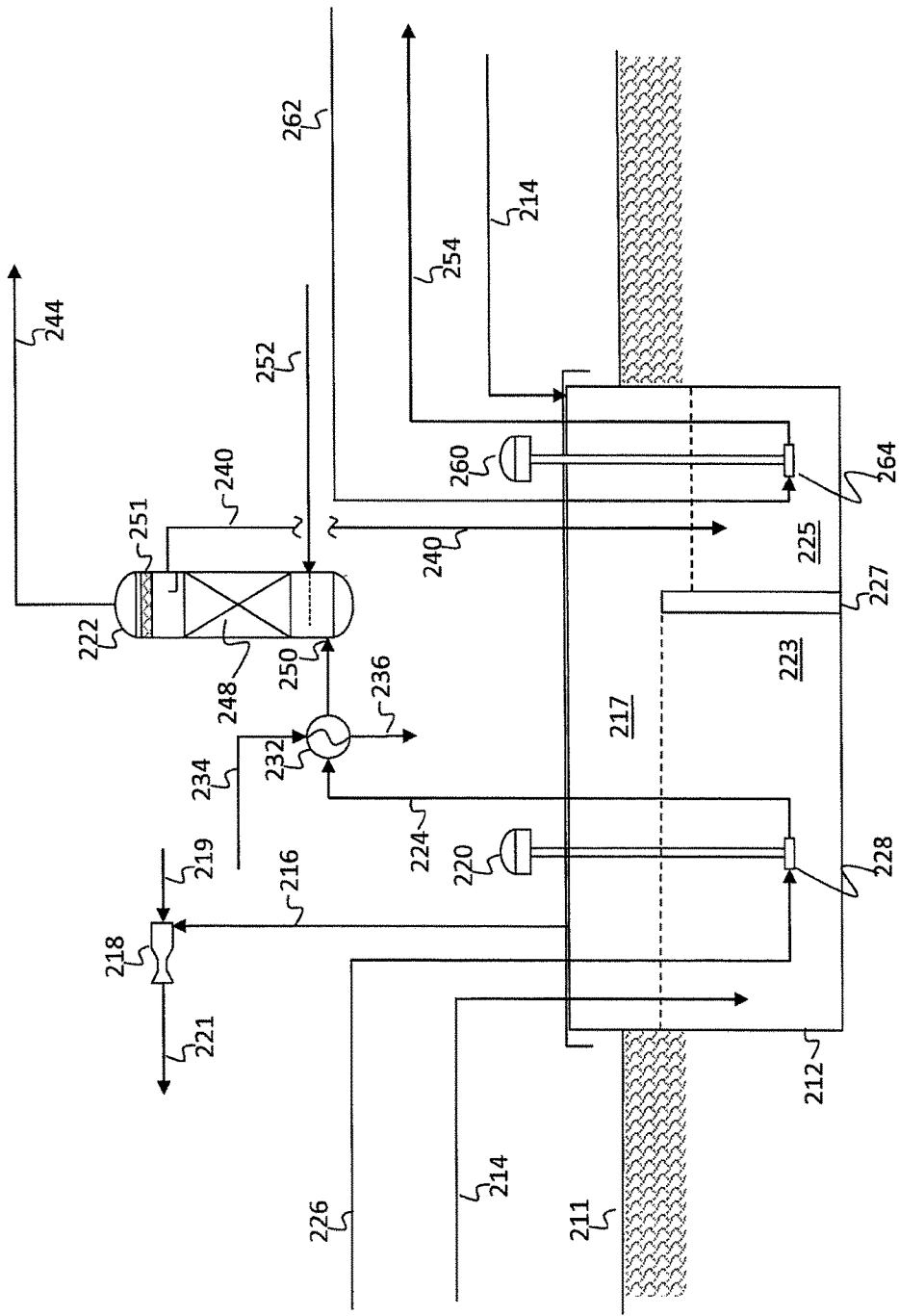
FIG. 2 is a simplified process flow diagram of a sulfur degassing system according to embodiments herein.

Referring now to FIG. 2, a simplified process flow diagram of a system for degassing liquid sulfur according to embodiments herein is illustrated. A sulfur product 210 from a sulfur recovery unit (not shown) may be fed to a sulfur pit 312, which may be at least partially below grade 211. Similar to the embodiment of FIG. 1, a sweep gas 214 may also be introduced to the vapor space of the sulfur pit 212. The sweep gas and other vapors may be withdrawn from the vapor space 217 of sulfur pit 212 via flow line 216. In some embodiments, the vapors may be withdrawn via a steam eductor218, where steam provided via flow line 219 may draw vapors from the sulfur pit into educator outlet line 221. The withdrawn vapors may then be fed via flow line 221 to an incinerator, a reaction furnace, or Claus reactors (not shown).

In this embodiment, sulfur pit 212 may include two liquid zones 223 and 225, separated by a weir 227. A first sulfur pump 220 may be used to transfer liquid sulfur from liquid zone 223 to a reactor/separator, storage vessel or storage tank 222 via flow line 224. Gas may be introduced via flow line 226 to a suction 228 of sulfur pump 220. The pump provides intimate mixing of the liquid sulfur intake and the gas, passing the resulting mixture to reactor/separator, storage vessel or storage tank 222.

If necessary, the liquid sulfur-gas mixture 224 may be heated or cooled via indirect heat exchange in exchanger 232. For example, the liquid sulfur—gas mixture may be cooled via indirect heat exchange with boiler feed water 234, and the heated boiler feed water 236 may be fed to the sulfur recovery unit (not shown).

In reactor/separator, storage vessel or storage tank 222, the liquid sulfur may be separated from the air or gas, hydrogen sulfide, and any water and/or sulfur dioxide formed. A degassed liquid sulfur or partially degassed liquid sulfur may be recovered from an upper portion of reactor222 via flow line 240, and the separated vapors may be recovered from a top of separator, storage vessel or storage tank 222 via flow line 244. The separated vapors may be fed, for example, to a sulfur recovery unit burner, a thermal oxidizer, or to an incinerator (not shown).

As illustrated in FIG. 2, reactor 222 includes a bed 248 of internals, which may be catalytic, such as a Claus catalyst. The bed 248 may be disposed above the feed point 250 of the liquid sulfur-gas mixture. Reactor 222 may also include a sufficient vapor-liquid disengagement zone or de-entrainment devices 251 to prevent entrainment of liquid sulfur into the separator, storage vessel or storage tank overhead system and associated piping. Reactor 222 may also include an inlet 252 proximate a bottom of the reactor 222 for introduction of gas to a lower portion of the reactor. Gas fed via inlet 252 may provide co-current contact with the liquid sulfur, further enhancing the degassing and reaction process.

The liquid sulfur recovered from reactor 222 via flow line 240 may be returned to sulfur pit 212, such as to liquid zone 225 of sulfur pit 212. A second sulfur pump 260 may be used to transfer the degassed or partially degassed liquid sulfur from zone 225 via flow line 254 to downstream processing (further gas separations, storage, loading, etc.).

In some embodiments, additional gas may be introduced to the liquid sulfur recovered from zone 225. For example, gas may be introduced via flow line 262 to a suction 264 of sulfur pump 260. Pump 260 then provides the intimate mixing of the liquid sulfur intake and the gas, passing the resulting mixture downstream.

Although not illustrated in FIG. 2, in some embodiments a liquid degassing catalyst may be combined with the undegassed or partially degassed liquid sulfur in zones 223, 225 prior to or after mixing of the liquid sulfur with the gas with pumps 220, 260.

Figure 3:
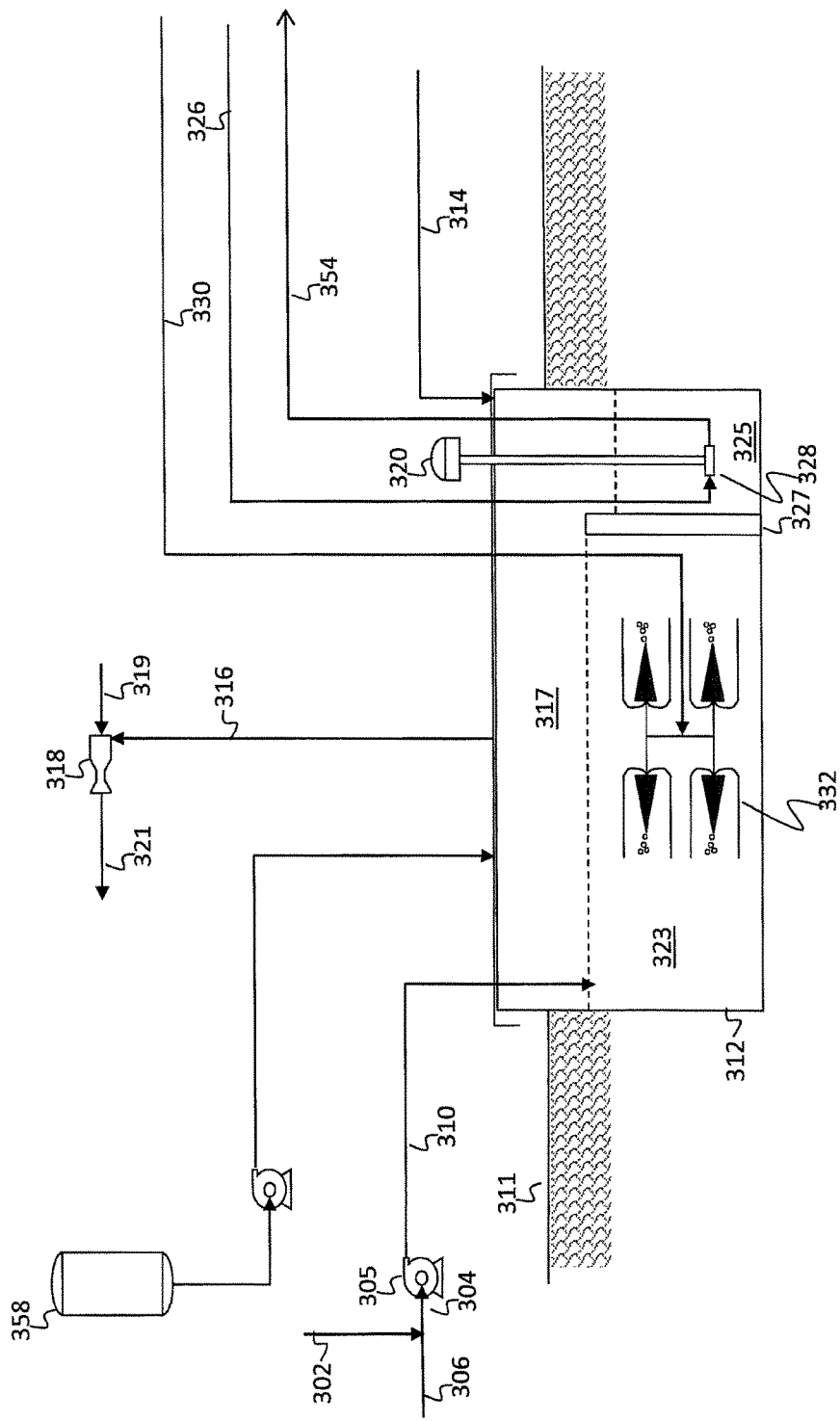
FIG. 3 is a simplified process flow diagram of a sulfur degassing system according to embodiments herein.

Referring now to FIG. 3, a simplified process flow diagram of a system for degassing liquid sulfur according to other embodiments herein is illustrated. A sulfur product 310 from a sulfur recovery unit (not shown) may be fed to a sulfur pit 312, which may be at least partially below grade 311. Similar to the embodiment of FIG. 1, a sweep gas 314 may also be introduced to the vapor space of the sulfur pit 312. The sweep gas and other vapors may be withdrawn from the vapor space 317 of sulfur pit 312 via flow line 316. In some embodiments, the vapors may be withdrawn via a steam eductor318, where steam provided via flow line 319 may draw vapors from the sulfur pit into educator outlet line 321. The withdrawn vapors may then be fed via flow line 321 to an incinerator, a reaction furnace, or Claus reactors (not shown).

In this embodiment, sulfur pit 312 may include two liquid zones 323 and 325, separated by a weir 327. Degassing air 330 may be introduced into the liquid sulfur in zone 323 via one or more distributors 332, which may include spargers or a combined agitation/distribution device, for example. Liquid sulfur accumulates within zone 323, overflowing into collection zone 325. In collection zone 325, a sulfur pump 320 may be used to transfer degassed or partially degassed liquid sulfur from liquid zone 325via flow line 354 to downstream processing (further gas separations, storage, loading, etc.).

To enhance conversion of hydrogen sulfide and hydrogen polysulfides and degassing of the liquid sulfur, gas 302 may be introduced to a suction 304 of a pump 305 used to deliver liquid sulfur product 306 from the sulfur recovery unit (not shown) to sulfur pit 312 via flow line 310. Enhancing gas may also be introduced via flow line 326 to a suction 328 of sulfur pump 320. The pumps 305, 320 may provide intimate mixing of the respective liquid sulfur intakes and the gas, passing the resulting mixture downstream.

In some embodiments, a liquid degassing catalyst may also be used to enhance degassing. For example, as illustrated in FIG. 3, a liquid degassing catalyst may be fed from a catalyst tank 358 to the sulfur pit 312 for admixture with the liquid sulfur in zone 323.

Figure 4:
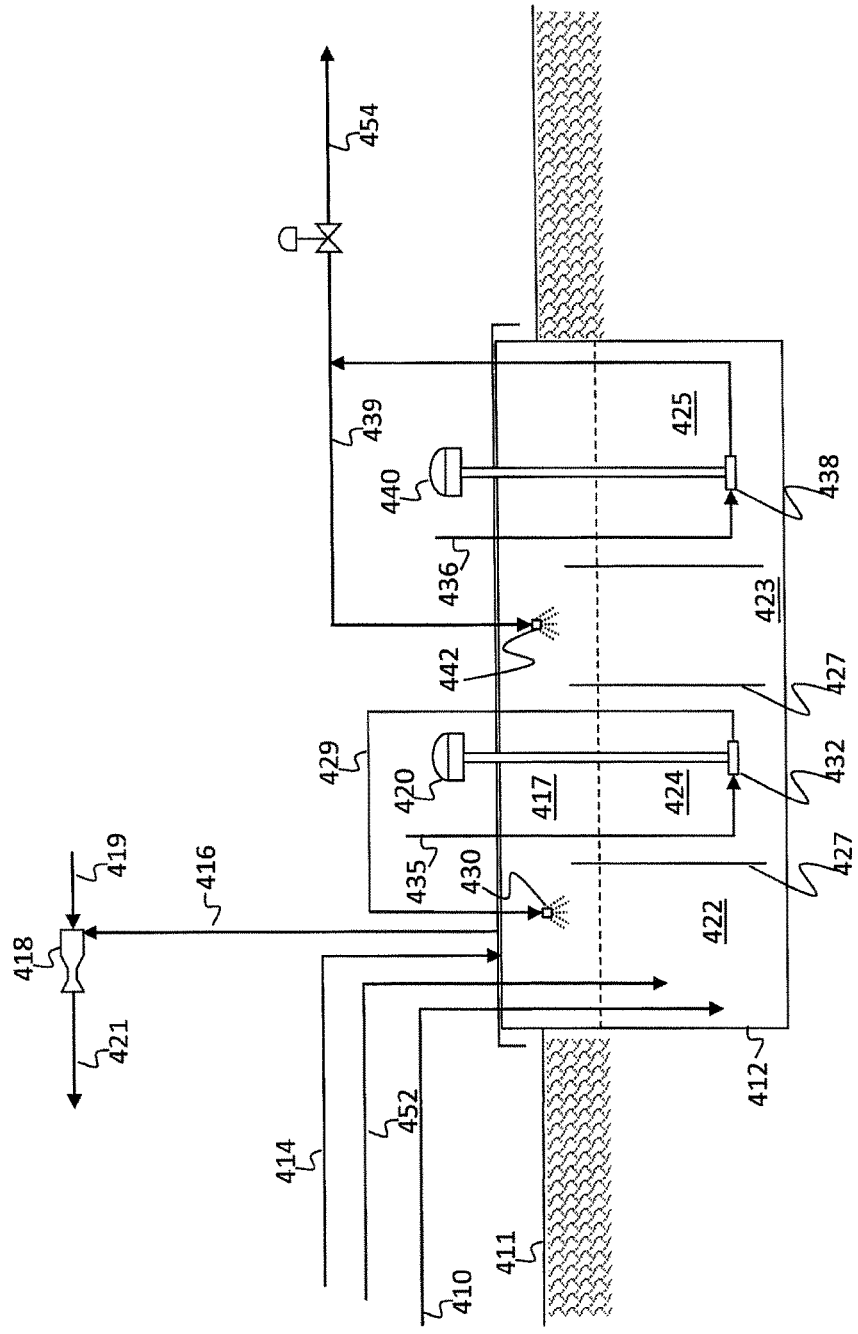
FIG. 4 is a simplified process flow diagram of a sulfur degassing system according to embodiments herein.

Referring now to FIG. 4, a simplified process flow diagram of a system for degassing liquid sulfur according to other embodiments herein is illustrated. A sulfur product 410 from a sulfur recovery unit (not shown) may be fed to a sulfur pit 412, which may be at least partially below grade 411. Similar to the embodiment of FIG. 1, a sweep gas 414 may also be introduced to the vapor space of the sulfur pit 412. The sweep gas and other vapors may be withdrawn from the vapor space 417 of sulfur pit 412 via flow line 416. In some embodiments, the vapors may be withdrawn via a steam eductor418, where steam provided via flow line 419 may draw vapors from the sulfur pit into eductor outlet line 421. The withdrawn vapors may then be fed via flow line 421 to an incinerator, a reaction furnace, or Claus reactors (not shown).

In this embodiment, sulfur pit 412 may include two or more mixing and degassing zones, which may be separated by baffles 427, for example. As illustrated, sulfur pit 412 may include four zones, including two mixing zones 422, 423 and two degassing zones 424, 425. Liquid communication may be provided between the zones under the baffles 427.

Liquid sulfur 410 may be introduced into mixing zone 422. Liquid sulfur from zone 424 may be drawn into a first submerged liquid sulfur pump420 and pumped via flow line 429 to a first spray nozzle 430. Spray nozzle 430 may be used, for example, to mix the liquid sulfur of zones 422, 424 with sweep gas, and may also be used to further degas the liquid sulfur, as the spray droplets may provide additional degassing surface area. Liquid sulfur from zone 425 may be drawn into a second submerged liquid sulfur pump 440 and pumped via flow line 439 to a second spray nozzle 442. Spray nozzle 442 may be used, for example, to mix the liquid sulfur of zones 423, 425 with sweep gas, and may also be used to further degas the liquid sulfur, as the spray droplets may provide additional degassing surface area.

Overall, the back mixing and spray systems may provide for efficient degassing of the liquid sulfur. A portion of the liquid sulfur circulating via sulfur pump 440 may be withdrawn via flow line 454 to downstream processing (further gas separations, storage, loading, etc.).

To enhance conversion of hydrogen sulfide and hydrogen polysulfides and degassing of the liquid sulfur, gas 435 may be introduced to a suction 434 of pump 420. Gas may additionally or alternatively be introduced via flow line 436 to a suction 438 of sulfur pump 440. The pumps 420, 440 may provide intimate mixing of the respective liquid sulfur intakes and the gas, enhancing conversion and degassing.

In some embodiments, a liquid degassing catalyst may also be used to enhance degassing. For example, as illustrated in FIG. 4, a liquid degassing catalyst may be introduced via flow line 452 to the sulfur pit 412 for admixture with the liquid sulfur in zone 422.

Figure 5:
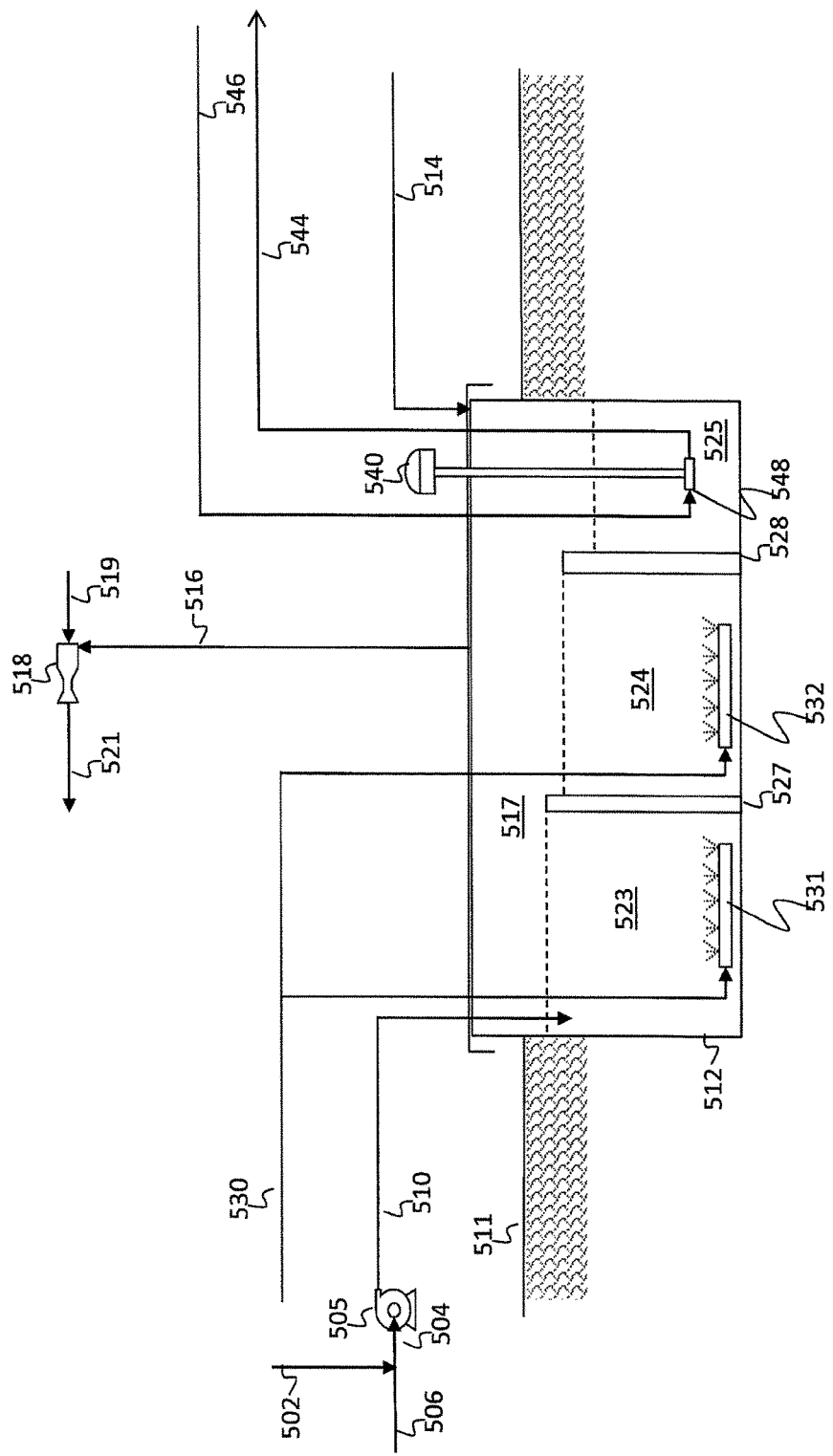
FIG. 5 is a simplified process flow diagram of a sulfur degassing system according to embodiments herein.

Referring now to FIG. 5, a simplified process flow diagram of a system for degassing liquid sulfur according to other embodiments herein is illustrated. A sulfur product 510 from a sulfur recovery unit (not shown) may be fed to a sulfur pit 512, which may be at least partially below grade 511. Similar to the embodiment of FIG. 1, a sweep gas 514 may also be introduced to the vapor space of the sulfur pit 512. The sweep gas and other vapors may be withdrawn from the vapor space 517 of sulfur pit 512 via flow line 516. In some embodiments, the vapors may be withdrawn via a steam eductor518, where steam provided via flow line 519 may draw vapors from the sulfur pit into educator outlet line 521. The withdrawn vapors may then be fed via flow line 521 to an incinerator, a reaction furnace, or Claus reactors (not shown).

In this embodiment, sulfur pit 512 may include three or more liquid zones 523, 524, and 325, separated by weir 527, 528. Degassing air 530 may be introduced into the liquid sulfur in zones523, 524 via one or more distributors 531, 532. Liquid sulfur accumulates within zone 523, overflowing into zone 524. Liquid sulfur, undergoing further degassing, accumulates within zone 524, overflowing into collection zone 525. In collection zone 525, a sulfur pump 540 may be used to transfer degassed or partially degassed liquid sulfur from liquid zone 525 via flow line 544 to downstream processing (further gas separations, storage, loading, etc.).

To enhance conversion of hydrogen sulfide and hydrogen polysulfides and degassing of the liquid sulfur, gas 502 may be introduced to a suction 504 of a pump 505 used to deliver liquid sulfur product 506 from the sulfur recovery unit (not shown) to sulfur pit 512 via flow line 510. Enhancing gas may also be introduced via flow line 546 to a suction 548 of sulfur pump 540. The pumps 505, 540 may provide intimate mixing of the respective liquid sulfur intakes and the gas, passing the resulting mixture downstream.

Although described in the Figures above as including a sulfur pit, the degassing operations as described herein may be carried out in association with sulfur transfer pipes and sulfur storage tanks or vessels, and is not limited to systems necessarily including a sulfur pit.

Figure 6:
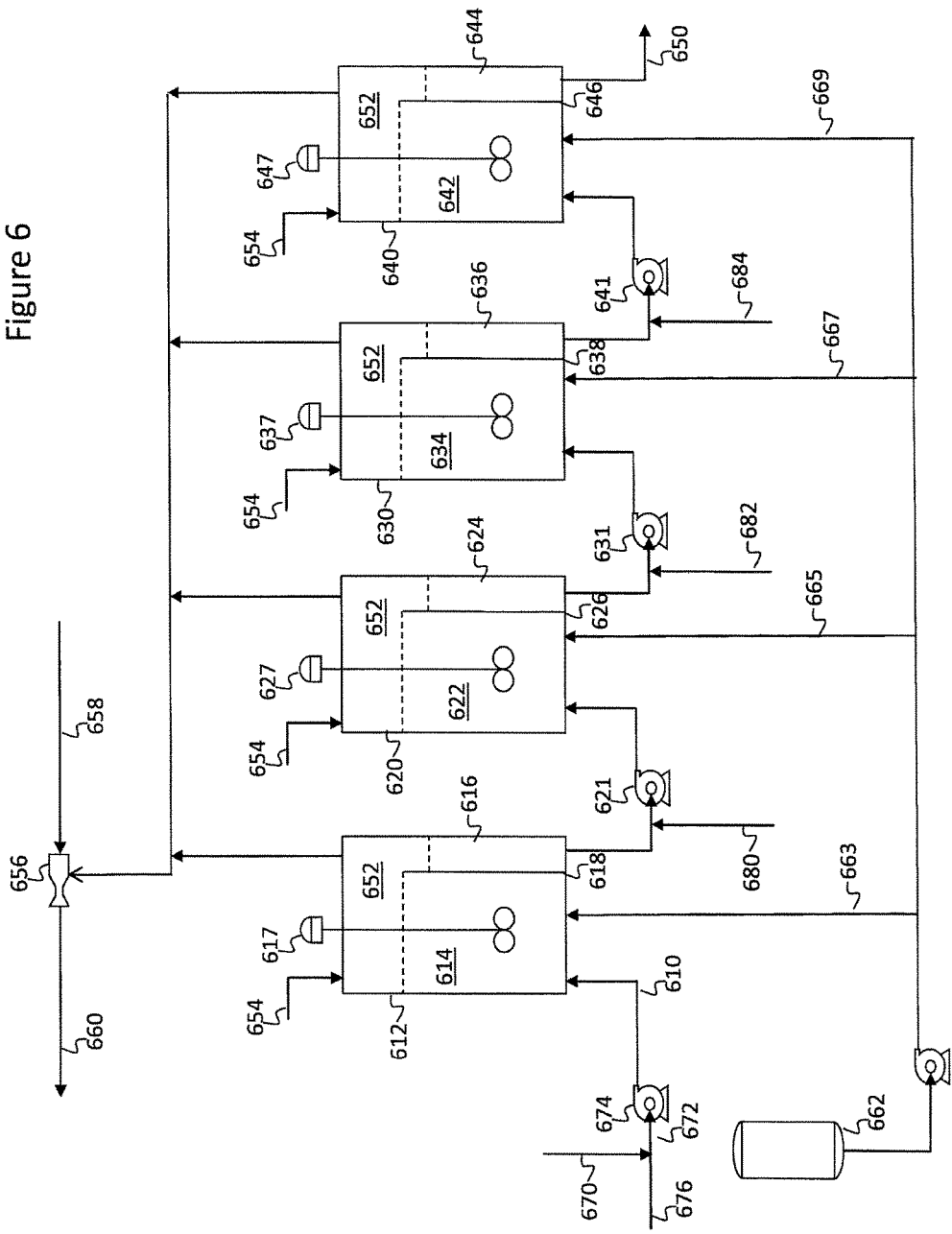
FIG. 6 is a simplified process flow diagram of a sulfur degassing system according to embodiments herein.

For example, referring to FIG. 6, a simplified process flow diagram of a system for degassing liquid sulfur according to other embodiments herein is illustrated, in which the degassing occurs in two or more degassing vessels. As illustrated, four degassing vessels may be used. A sulfur product 610 from a sulfur recovery unit (not shown) may be fed to a first degas vessel 612, which may include a mixing zone 614 and a collection zone 616 separated by a weir 618. The liquid sulfur may be agitated within mixing zone 616 using an agitator 617, and partially degassed liquid sulfur may flow over weir 618 into collection zone 616.

Partially degassed liquid sulfur may then be withdrawn from collection zone 616 and transferred to a second degas vessel 620. The transfer of liquid sulfur may occur via gravity or pressure, and in some embodiments may be pumped from degas vessel 612 to degas vessel 620 via a pump 621. Similar to degas vessel 612, degas vessel 620 may include a mixing zone 622 and a collection zone 624 separated by a weir 626. The liquid sulfur may be agitated within the mixing zone 622 using an agitator 627, and partially degassed liquid sulfur may flow over weir 626 into collection zone 624.

Similar degassing occurs along the remainder of the train of degassing vessels. Partially degassed liquid sulfur may be withdrawn from collection zone 624 and transferred to a third degas vessel 630. The transfer of liquid sulfur may occur via gravity or pressure, and in some embodiments may be pumped from degas vessel 620 to degas vessel 630 via a pump 631. Similar to degas vessel 612, degas vessel 630 may include a mixing zone 634 and a collection zone 636 separated by a weir 638. The liquid sulfur may be agitated within the mixing zone 634 using an agitator 637, and partially degassed liquid sulfur may flow over weir 638 into collection zone 636.

Partially degassed liquid sulfur may then be withdrawn from collection zone 636 and transferred to a fourth degas vessel 640. The transfer of liquid sulfur may occur via gravity or pressure, and in some embodiments may be pumped from degas vessel 630 to degas vessel 640 via a pump 641. Similar to degas vessel 612, degas vessel 640 may include a mixing zone 642 and a collection zone 644 separated by a weir 646. The liquid sulfur may be agitated within the mixing zone 642 using an agitator 647, and partially or fully degassed liquid sulfur may flow over weir 646 into collection zone 644. The partially or fully degassed liquid sulfur may then be transferred via flow line 650 to downstream processing (further gas separations, storage, loading, etc.).

As the degassing progresses, vapors may accumulate in the head space 652 of each degassing vessel (612, 620, 630, 640). A sweep gas 654 may be introduced into the vapor space 652 of each degassing vessel, respectively. The sweep gas and other vapors may be withdrawn from the respective vapor spaces 652, which similar to other embodiments, may be performed using a steam eductor656 and steam feed 658, and the effluent 660 may then be fed via flow line to an incinerator, a reaction furnace, or Claus reactors (not shown).

A liquid degassing catalyst may also be used to enhance degassing. For example, as illustrated in FIG. 6, a liquid degassing catalyst may be fed from a catalyst tank 662 to a mixing zone (614, 622, 634, 642) of one or more of the degassing vessels (612, 620, 630, 640) for admixture with the liquid sulfur in the respective mixing zones via flow lines 663, 665, 667, 669.

To enhance conversion of hydrogen sulfide and hydrogen polysulfides and degassing of the liquid sulfur, gas 670 may be introduced to a suction 672of a pump 674 used to deliver liquid sulfur product 676 from the sulfur recovery unit (not shown) to degassing vesse1612 via flow line 610. Enhancing gas may also be introduced via one or more of flow lines 680, 682, 684 to a suction of liquid sulfur transfer pumps 621, 631, 641, respectively. The pumps may provide intimate mixing of the respective liquid sulfur intakes and the gas, passing the resulting mixture downstream and providing the desired enhancement in conversion.

As described above, processes and systems disclosed herein provide for the thorough mixing of gas and liquid sulfur, resulting in a high efficiency process for the conversion of hydrogen sulfide and hydrogen polysulfides and degassing of the liquid sulfur. While described with respect to a limited number of systems, other degassing systems that include a sulfur transfer pump may likewise be modified. By operating the degassing system in the manner described above, one or more of the following benefits may be realized.

The degassing operations as described herein may be carried out in the sulfur transfer pipes and a vertical vessel and/or storage tank that is external to the sulfur pit. A large pit with special internals is not required.

Introducing the gas into the pump suction according to embodiments herein provides dynamic mixing of the $H_2S/H_2S_x$ contaminants with the gas stream thus improving process sulfur degassing kinetics. Operating in the temperature range of 280 to 285° F. and pressure range of 30 to 35 psig, for example, eliminates the condensation of water vapor and thus reduces the corrosion problems associated with other commercial degassing units.

Sulfur degassing processes can be retrofitted to take advantage of the process flow schemes described herein, improving degassing performance and addressing corrosion issues. The degassing systems disclosed herein also lend themselves well to modular construction. Further, the degassing separator, storage vessel or storage tank can be installed while the sulfur recovery unit (SRU) is in operation, and only minimal downtime is typically required for tie-ins.

The sulfur pit or collection vessel used in embodiments herein may be small (4 hours working volume or less). This reduces the SRU plot requirements and overall cost. The increased oxidation reaction rate may allow the degassing residence time to be on the order of minutes compared to 4-24 hours for most other processes. Injection of fluid catalyst into the undegassed liquid sulfur combined with the intimate process gas mixing in the sulfur transfer pump according to embodiments herein may result in very rapid sulfur degassing. The much shorter residence time allows the degassing contactor/separator, storage vessel or storage tank to be small which results in lower contactor cost and small plot requirements.

Low pressure gas may be introduced to the pump suction and the combined gas/sulfur stream is pressurized. This allows the degassing equipment to be located at any convenient location a reasonable distance from the sulfur rundown/feed pit and degassed sulfur storage/loading facilities.

The process piping associated with embodiments disclosed herein may be smaller and less expensive because the sulfur is pumped and pressurized gas is used as the feed stream, versus using gravity sulfur flow and low-pressure air. For continuous operation, the sulfur feed pump capacity can be lower than the normal transfer pump since the sulfur feed rate is equal to the production rate. The production rate is normally significantly lower than the truck/rail loading rate or transfer rate to storage. This also allows the sulfur feed piping to be smaller.

Processes and systems according to embodiments herein may be less costly to install than pit-based systems and with the pump providing degassing, the external equipment will be smaller than other commercial units. Maintenance requirements of systems disclosed herein may also be comparatively low, as the only rotating equipment items required are the sulfur pumps and process gas compressor (if required), which are both very reliable. Maintenance, if and when required, is easier to facilitate than the in-pit components of pit degassing systems.

Operator attention may be minimal because the process operation of embodiments herein is very stable and process control is simple. Operating costs are also low. The only utility usages are power for the sulfur feed pump and gas compression, low pressure steam for heat tracing, and instrument air. The degassed sulfur product is available at sufficient pressure to transfer the product to storage, loading, or forming without additional pumping.

Theسulfur pit is typically operated at the lowest practical liquid sulfur level. This results in minimum residence time in the pit for undegassed sulfur, which minimizes the $H_2S$ release upstream of the degassing unit. Total sulfur emissions from the sulfur complex may be reduced by degassing sulfur according to embodiments herein, as compared to systems where $H_2S$ released in the pit is normally routed to the incinerator or released directly into the atmosphere.

The process effluent from degassing systems disclosed herein may contain much less sulfur vapor, as the quantity of the effluent vapor is an order of magnitude lower than that of other processes. For example, the expected air requirements will be in the range of about 0.0005 to 0.01 lb of air per lb of liquid sulfur. Equally significant, the concentration of sulfur vapor in the degassing process effluent may be much lower than that of atmospheric processes, as concentration is determined by the fraction of sulfur vapor pressure (i.e., the partial pressure of sulfur in the vapor) over total system pressure.

Embodiments disclosed herein provide for lower liquid sulfur entrainment levels due to the relatively low gas rates of the degassing system. The elevated operating pressure further reduces the actual volume of vapor flow in comparison to other processes which operate under a slight vacuum.

Embodiments disclosed herein may result in a higher conversion of $H_2S$ to liquid sulfur. The process reacts most of the $H_2S$ to sulfur, as opposed to degassing systems that operate at low pressure to strip $H_2S$ from the liquid sulfur.

Embodiments disclosed herein operate under pressure, allowing the overhead gas stream to be routed to the main SRU burner, tail gas unit burner, or upstream of a selective oxidation stage such as SUPERCLAUS. Routing to any of these locations may result in zero sulfur emissions from the degassing unit. The overhead stream can also be routed to the thermal oxidizer.

Further, degassed sulfur produced using embodiments disclosed herein can be stored in an above ground storage tank without vapor recovery thus allowing naturally induced sweep air of the tank vapor space.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for degassing liquid sulfur, the process comprising:
   mixing a gas with a liquid sulfur mixture comprising sulfur, hydrogen sulfide, and hydrogen polysulfides to form a sulfur-gas mixture;
   transporting the sulfur-gas mixture to a separator, storage vessel or storage tank;
   separating the sulfur-gas mixture at a pressure below a water condensation point to recover a degassed sulfur product and a vapor stream comprising hydrogen sulfide;

wherein mixing gas with the liquid sulfur mixture comprises:
  introducing the gas into a suction of a sulfur transfer pump used for transporting the liquid sulfur mixture to the separator, storage vessel or storage tank;
  introducing the gas into a transfer line during transport of the liquid sulfur mixture to the separator, storage vessel or storage tank; or
  a combination thereof.

2. The process of claim 1, wherein the gas comprises air, nitrogen, oxygen, oxygen enriched air, $SO_2$, $CO_2$, Claus reactor tail gas, SRU tail gas and tail gas treatment unit recycle gas or tail gas, or a mixture thereof.

3. The process of claim 1 or claim 2, wherein the gas is air having a relative humidity of less than 10% measured at 25° F.

4. The process of claim 1 or claim 2, further comprising mixing a liquid degasification catalyst with the liquid sulfur mixture.

5. The process of claim 4, wherein the liquid degasification catalyst comprises one or more of cyclohexylamine, morpholine, or urea.

6. The process of claim 1 or claim 2, wherein the separating is conducted at a temperature in the range from about 250° F. to about 300° F. and a pressure of less than 40 psig.

7. The process of claim 6, wherein the separating is conducted at a temperature in the range from about 260° F. to about 290° F. and a pressure in the range from about 20 psig to about 35 psig.

8. The process of claim 1 or claim 2, wherein an average residence time of the liquid sulfur mixture during the transporting and separating steps is in the range from about 0.5 minute to about 30 minutes.

9. The process of claim 1 or claim 2, wherein the separating comprises:
  feeding the sulfur-air mixture to an upper portion of the separator, storage vessel or storage tank; and
  feeding air to a lower portion of the separator, storage vessel or storage tank.

10. A process for degassing liquid sulfur, the process comprising:
  transporting, from a sulfur pit or vessel, a liquid sulfur mixture comprising sulfur, hydrogen sulfide, and hydrogen polysulfides via a sulfur transfer pump;
  introducing gas into a suction of the sulfur transfer pump, the sulfur transfer pump mixing the gas and the liquid sulfur mixture to form a sulfur-gas mixture;
  separating the sulfur-gas mixture to recover a degassed sulfur product and a vapor stream comprising hydrogen sulfide.

11. The process of claim 10, further comprising:
  transporting, from the sulfur pit or vessel to a separator, storage vessel or storage tank, the liquid sulfur mixture;
  separating the sulfur-gas mixture in the separator, storage vessel or storage tank to recover the degassed sulfur product and the vapor stream comprising hydrogen sulfide;
  wherein the gas comprises air, nitrogen, oxygen, oxygen enriched air, $SO_2$, $CO_2$, Claus reactor tail gas, SRU tail gas and tail gas treatment unit recycle gas or tail gas, or a mixture thereof.

12. The process of claim 11, further comprising introducing additional gas into the sulfur-gas mixture intermediate the sulfur transfer pump and the separator, storage vessel or storage tank, where the additional gas introduced may be the same or different than that introduced into the suction of the sulfur transfer pump.

13. The process of claim 11 or claim 12, further comprising feeding additional gas to a lower portion of the separator, storage vessel or storage tank and countercurrently contacting the additional gas with the sulfur-air mixture fed to the separator, storage vessel or storage tank, where the additional gas introduced may be the same or different than that introduced into the suction of the sulfur transfer pump.

14. The process of claim 11, further comprising transferring the degassed sulfur product from the separator, storage vessel or storage tank to a downstream vessel without additional pumping.

15. The process of claim 10, further comprising feeding a liquid degasification catalyst to the sulfur pit.

16. A system for degassing liquid sulfur, the system comprising:
  a sulfur pit or vessel containing a liquid sulfur mixture comprising sulfur, hydrogen sulfide, and hydrogen polysulfides;
  a separator, storage vessel or storage tank;
  a sulfur transfer pump for transferring the liquid sulfur mixture from the sulfur pit to the separator, storage vessel or storage tank;
  a feed line for introducing pressurized gas to the liquid sulfur during transfer from the sulfur pit or vessel to the separator, storage vessel or storage tank, wherein the pressurized gas comprises air, nitrogen, oxygen, oxygen enriched air, $SO_2$, $CO_2$, Claus reactor tail gas, SRU tail gas and tail gas treatment unit recycle gas or tail gas, or a mixture thereof;
  a separator, storage vessel or storage tank vapor outlet for recovering a vapor product comprising hydrogen sulfide; and
  a separator, storage vessel or storage tank liquid outlet for recovering a degassed liquid sulfur product.

17. The system of claim 16, wherein the feed line is configured to introduce the pressurized gas to a suction of the sulfur transfer pump.

18. The system of claim 16 or claim 17, further comprising a feed line for feeding additional gas to a lower portion of the separator, storage vessel or storage tank.

19. The system of claim 16 or claim 17, further comprising an exchanger for increasing or reducing a temperature of the liquid sulfur mixture intermediate the sulfur transfer pump and the separator, storage vessel or storage tank.

20. The system of claim 16 or claim 17, further comprising a feed line for introducing a liquid degassing catalyst to the sulfur pit or vessel.

* * * * *